United States Patent [19]
Policelli

[11] Patent Number: 5,846,364
[45] Date of Patent: Dec. 8, 1998

[54] REINFORCED CONCRETE STRUCTURE, REINFORCING DEVICE, AND METHOD FOR PRODUCING SAME

[76] Inventor: Frederick J. Policelli, 4891 Wallace La., Salt Lake City, Utah 84117

[21] Appl. No.: 829,161

[22] Filed: Mar. 31, 1997

Related U.S. Application Data

[62] Division of Ser. No. 441,386, May 15, 1995.

[51] Int. Cl.6 .......................... B65H 81/00; B32B 31/00
[52] U.S. Cl. .................. 156/169; 52/233.14; 52/649.1; 156/172; 156/425; 428/105; 428/294.7
[58] Field of Search .................................. 156/169, 172, 156/173, 425; 52/233.14, 649.1; 428/105, 113, 107, 294.7

[56] References Cited

U.S. PATENT DOCUMENTS

| | | | |
|---|---|---|---|
| 2,239,635 | 4/1941 | William, Jr. | |
| 3,111,569 | 11/1963 | Rubenstein | 52/233.14 |
| 3,434,899 | 3/1969 | Tankersley | 156/172 |
| 3,533,203 | 10/1970 | Fischer et al. | 52/233.14 |
| 3,551,237 | 12/1970 | Cox et al. | |
| 3,813,098 | 5/1974 | Fischer et al. | 52/233.14 X |
| 4,706,430 | 11/1987 | Sugita et al. | 52/649.1 X |
| 4,750,960 | 6/1988 | Bubeck | 156/169 |

FOREIGN PATENT DOCUMENTS 2004835  4/1979  United Kingdom.

*Primary Examiner*—Jeff H. Aftergut
*Attorney, Agent, or Firm*—Mallinckrodt & Mallinckrodt

[57] ABSTRACT

Method and apparatus for producing an advanced fibrous composite, concrete-reinforcing bar device by laying down a continuous band of tow or tows, yarn or yarns, or strand or strands of very fine filaments and liquid bonding material along at least an elongate, removable, form piece as a band member of endless belt formation through a delivery eye that reciprocates longitudinally along such form piece, which form piece is removed after setting of the bonding material to provide an empty space between a pair of load-bearing tandem portions of such band member.

11 Claims, 3 Drawing Sheets

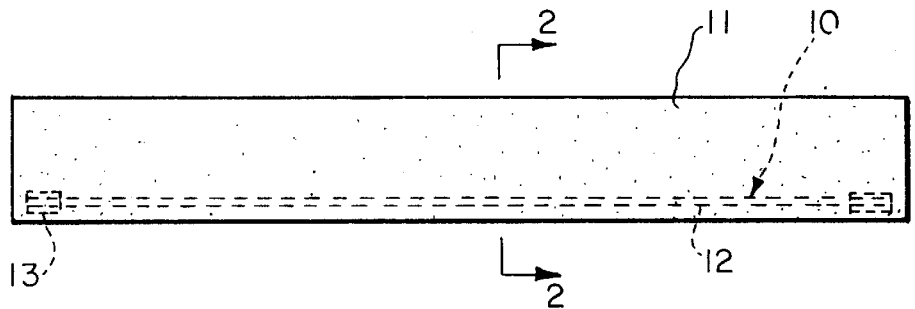
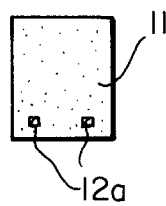
FIG. 1  FIG. 2
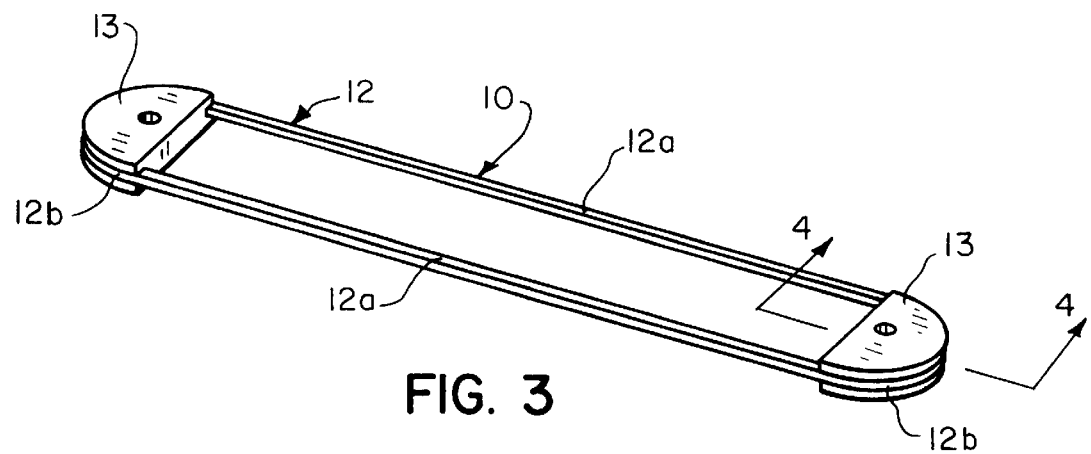
FIG. 3
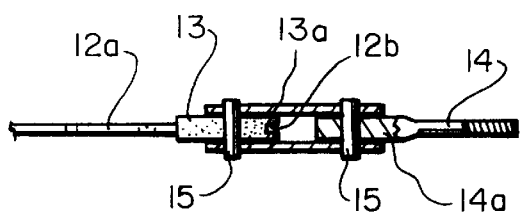
FIG. 4
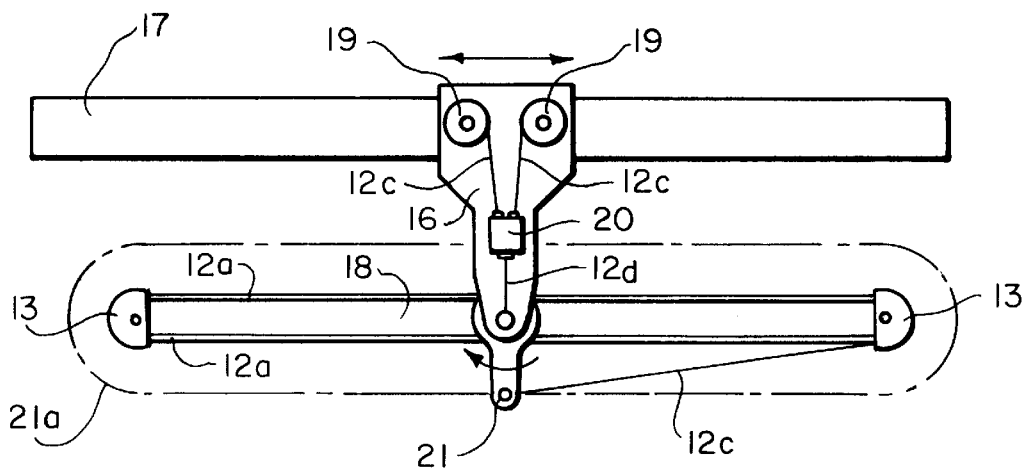
FIG. 5

REINFORCED CONCRETE STRUCTURE, REINFORCING DEVICE, AND METHOD FOR PRODUCING SAME

PRIOR APPLICATION

This is a division of copending application Ser. No. 08/441,386, filed May 15, 1995, reading and entitled "Reinforced Concrete Structures".

BACKGROUND OF THE INVENTION

1. Field

The invention is in the field of reinforced concrete construction and of methods and apparatus for producing concrete reinforcing devices.

2. State of the Art

Concrete structures have long been reinforced with steel bars, commonly referred to as "rebar", or with wire mesh. Such reinforcements present problems in structures, such as concrete bridges, that are exposed to the weather. The extensive use of deicing chemicals and the existence of both natural and man-made corrosive environments are drastically reducing the service life of these structures by reason of corrosion of the steel reinforcement, which progressively promotes debonding and spalling of the concrete and seriously reduces structural strength of the facility. Newer designs of concrete structures and coating of steel bars with various materials, such as rubber or epoxy, to prevent such corrosion have not solved the problem.

Composite structural materials are well-known. These are made up of large numbers of very fine structural filaments, such as glass, carbon, or a material known as "aramid", which have been bound together as, in effect, laminae of a continuous band by application thereto of a settable liquid bonding material, such as an epoxy, in a manner well-known in the production of what have become known as "advanced composites" and which are beginning to be used in civil engineering structures. Such material has been utilized successfully in some forms of concrete reinforcing devices for special applications in water treatment plants, chemical processing plants, and marine installations, but there are wider fields of use that have only begun to be considered, as in the reinforcing of concrete in highway bridges, railway bridges, commercial buildings, etc.

In addition to having desirable strength properties, concrete reinforcing devices must have reliable means for anchorage to the concrete. The anchorages must be such that high loads can be effectively transferred from the concrete to the reinforcement. To be fully effective, the anchorages must perform continuously and cyclically over long periods of time, without loss of strength and without imposing significant degradation to either the concrete or the reinforcement.

Prior art proposals for use of such advanced composites in concrete reinforcing devices are limited by low anchorage strength. For example, owing to incorporation of mechanical anchorages, such as wedges and clamps, at terminations of single, straight bar tendons, and to the behavior of these mechanical devices as so incorporated, the result is low efficiency, particularly under cyclic tension loading. There are high interlaminar and bond shear stresses within the structural filament laminates and at the surfaces thereof, which adversely affect such mechanical anchorages.

Elongate structural filaments associated together longitudinally as a starting material are usually spoken of in the art concerned as a "fiber bundle". Such bundle may be a "tow", or, if a "single" tow is twisted, a "yarn", or, if two or more yarns are twisted together, a "strand".

SUMMARY OF THE INVENTION

Concrete reinforcing devices concerned are of an advanced composite material in elongate form for use in reinforcing various structural shapes, such as beams, columns, struts, etc., and constitute at least one bar of endless belt formation made up of a continuous band or bands of one or more fiber bundles of tow or tows, of yarn or yarns, or of strand or strands of very fine reinforcing filaments. In the various embodiments of such device, the bar extends longitudinally of the device in one way or another and at opposite ends of the device in preferably arcuate formation as an endless belt of unbroken continuity. Each bar and each endless belt band member of the bar has at least two length portions doubled back so that such length portions extend and are spaced apart as load-bearing tendons between opposite end portions of the device. The end portions are continuations of the length portions, whereby the reinforcing filaments continue from one length portion at an end portion of the device to another of the length portions in endless belt formation. The reinforcing structural device is open between the band member lengths of the bar for the reception of concrete. A settable material, such as a resin, surrounds and bonds the plurality of filaments along the band member length portions and at the end portions of the bar.

In one form, the bar comprises a band member or band members, each having spaced apart, preferably straight, longitudinal tendons and opposite end portions formed around respective structural fid members to provide a concrete reinforcing device that can be used for pre-tensioning or for post-tensioning purposes, or that has such opposite end portions merely turned around the bar ends. In both instances, whether or not fid members are present, the opposite end portions desirably form respective arcs and provide anchorages at the looped ends of the bar.

Another version of the device comprises at least one band member having preferably straight tendon lengths with opposite ends deflected and wrapped around conical end surfaces of respective fid members.

In another embodiment, the device is formed as a bar of endless belt, three-dimensional, mesh formation. A band member is interwoven longitudinally as a mesh shell. The mesh shell, which may be of various shapes in transverse cross section, provides nodes at the locations at which portions of the band members cross and overlap other portions of the band members. These overlaps or interlocking nodes provide effective anchorages for the reinforcement to the concrete.

THE DRAWINGS

The best modes presently contemplated for carrying out the invention are illustrated in the accompanying drawings in which:

FIG. 1 represents a longitudinal side elevation of a structurally reinforced concrete beam, showing by broken lines a concrete reinforcing device of advanced fibrous composite material provided at its ends with fid members and embedded in concrete interiorly of the beam;

FIG. 2, a transverse vertical section taken on the line 2—2 of FIG. 1;

FIG. 3, a pictorial view looking down on the top of the concrete reinforcing device of FIG. 1 prior to its being incorporated in the concrete beam of FIGS. 1 and 2;

FIG. 4, a fragmentary, longitudinal, vertical section taken on the line 4—4 of FIG. 3, wherein the fid members carry attachment means for customary pre-tensioning or post-tensioning apparatus;

FIG. 5, a schematic front elevational view of apparatus for carrying out the method of producing the reinforcing device of FIG. 3, the path of travel of the band delivery eye being indicated by a broken line;

FIG. 6, a view corresponding to that of FIG. 1 but showing a reinforced concrete beam incorporating a different form of the reinforcing device;

FIG. 7, a view corresponding to that of FIG. 2 but taken on the line 7—7 of FIG. 6;

FIG. 8, a view corresponding to that of FIG. 3, but of the reinforcing device of FIG. 6;

FIG. 9, a view corresponding to that of FIG. 5, but of apparatus for carrying out the method of producing the device of FIG. 8;

FIG. 10, a view corresponding to those of FIGS. 1 and 6 but illustrating a concrete beam reinforced by another embodiment of the reinforcing device in which the bar is a unitary mesh shell having the band member interwoven and overlapped to form anchoring nodes;

FIG. 11, a view corresponding to those of FIGS. 2 and 7 but taken on the line 11—11 of FIG. 10;

FIG. 12, a view corresponding to those of FIGS. 3 and 8 but showing the interwoven mesh shell embodiment of reinforcing device shown in FIG. 10;

FIG. 13, a fragmentary side elevation of the right-hand end of the mesh shell embodiment of FIG. 12 drawn to a somewhat larger scale; and FIG. 14, a view corresponding to those of FIGS. 5 and 9, but showing the apparatus for carrying out the method used to produce the mesh shell embodiment of FIG. 12.

DETAILED DESCRIPTION OF THE ILLUSTRATED EMBODIMENTS

Figures 6, 7:
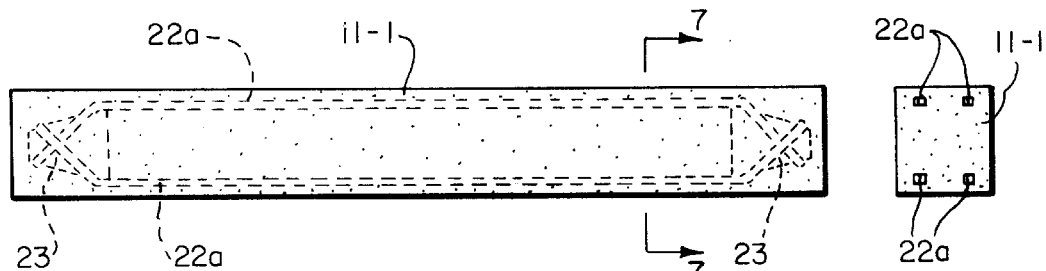

As illustrated in FIGS. 1 and 2, a bar 10 as the advanced composite, concrete reinforcing device, see FIG. 3, is embedded in concrete 11 to provide pairs of coextensive length portions 12a of a band member 12 as longitudinal tendons spaced apart along their lengths to receive the concrete 11 as a wet mix prior to its setting as the final reinforced concrete beam of FIGS. 1 and 2. The respective opposite end portions 12b of band member 12 are shown as wrapped around arcuate receiving grooves 13a, respectively, of fid members 13, which may or may not be present depending upon whether there is to be pre-tensioning or post-tensioning. Whether the fid members are present or not, the length members 12a of the band member 12 are preferably straight and continue around the ends of the device in unbroken continuity.

The bar 10 is formed as an endless, elongate belt of a high strength, high modulus, advanced fibrous composite. Very fine structural filaments of glass, graphite, aramid, or other material normally used in the production of such composites are bonded together by a set liquid bonding material, such as a resin.

For pre-tensioning or post-tensioning purposes, the fid members 13 may be provided, as shown in FIG. 4, with attachment means, such as a threaded shank 14, that is usually pivotally secured, as by respective pins 15, to fid member 13 and shank head 14a, for attachment of customary pre-tensioning or post-tensioning apparatus.

The bar 10 may be a single elongate band member 12 that provides loop ends for the bar, or there may be sets of the band members 12 superimposed, or arranged side-by-side, as laid down by the apparatus of FIG. 5.

In the apparatus of FIG. 5, a carriage 16 is slidably mounted on an elongate track 17 for reciprocation, by powered mechanism (not shown), longitudinally of an elongate, center, form piece 18 removably carrying half-circle form pieces (which may be the fid members 13) at its opposite ends, respectively. Filament tows, yarns, or strands 12c to be consolidated into a continuous length band 12d are fed continuously from respective reels 19 through a bonding resin applicator 20 to a band delivery eye 21 rotatably mounted at the lower end of carriage 16 for travelling a path 21a along the center form piece 18 and about the end form pieces, here the fid members 13, to lay down preferably straight band member length portions 12a, FIG. 3, and arcuate band member end portions 12b.

This embodiment of the device comprises preferably straight tendon length portions 12a continuing around half-circle arcs as end portions 12b, with semi-circular fids 13 at opposite ends of the device for the purpose, if constructed for example as in FIG. 4, of inducing a pre-tensioning or a post-tensioning load on the tendons 12a. Longitudinal loads, comprising induced loads and tendon loads resulting from static and dynamic loading of a concrete structure that incorporates such a bar device as reinforcement for the concrete, are active at the respective half-circle contact surfaces between the tendon members 12a and the semi-circular fids 13 and between other surfaces of the semi-circular fids and the cast concrete 11. For concrete reinforcing that does not use induced loads, the semi-circular fids are not necessary. Without them, the load interaction occurs directly between the end portions 12b and the cast concrete 11.

The longitudinal interaction load between a tendon and the concrete in this unique endless belt anchorage of the device to the concrete is in the form of a radial bearing, which becomes a compressive stress in the tendon portion and is preferred over other forms of loading that result in interlaminar stresses. The reaction of this radial bearing becomes likewise a compressive stress in the fid member and the concrete. This is a desirable type of stress for concrete.

In using the devices embedded in concrete, the unique tendon and anchorage system becomes the principal tension system of the concrete structure. Alternatively, this tendon and anchorage arrangement can be used as assembled and anchored externally to the surface of precast concrete elements to become a tension system of the structure.

The method of making the tendon bar device of FIG. 3 comprises utilizing the filament bundle winding portion of the apparatus of FIG. 5 to provide a fibrous, laminate tow, yarn, or strand 12c; impregnating the bundled fibrous tow, yarn, or strand laminae with a settable bonding liquid, such as a resin, to form a continuous band 12d; laying down the band continuously, as an endless belt member 12 of the bar 10, about form means typically having a removable, straight, center piece 18 and outwardly arcuate end pieces 13, by a reciprocatable delivery member having a rotatably mounted delivery eye 21, which is moved in an oval path around the form means as held stationary; setting the bonding liquid by either blowing air over the impregnated laminae, which is conventional, or by merely having it exposed to the atmosphere; and finally removing at least the center form piece 18. By this method and apparatus, a very large number of continuous filaments are brought together rapidly to form the band member 12 having substantially coextensive length portions 12a and conforming to a preferably straight oval, endless, belt shape.

Many types of filaments can be used, as well as many types of settable, liquid materials, preferably having the characteristics of resin, including thermoset resins, such as epoxy and polyester, and thermoplastic resins.

In FIGS. 6 through 9, a deflected or angled tendon system of the invention is schematically illustrated. This is a variant of the first tendon system. It comprises one, or, as shown, a plurality, of deflected or angled bars (band members) 22 of endless belt formation, each with preferably straight, longitudinal length portions 22a, FIG. 8, and deflected portions 22b at opposite ends and continuing as end portions 22c around the bar ends on arcs, all such portions of a bar being made together as a single continuous band member of endless belt formation. The final device as here shown has a three-dimensional, shell shape with canted ends and, typically, with conical fid members 23 at opposite looped ends of the bar. Such looped ends of the bar are for the purpose of anchoring. The conical fid members 23 at the ends of the deflected or angled bars may be used to induce pre-tensioning or post-tensioning loads in the tendons.

Post-tensioning of a deflected tendon can be performed with fid members external to the concrete if the tendon end portions are extended beyond the concrete 11-1 that is cast into the space between the tendon length portions 22a.

Figure 8:
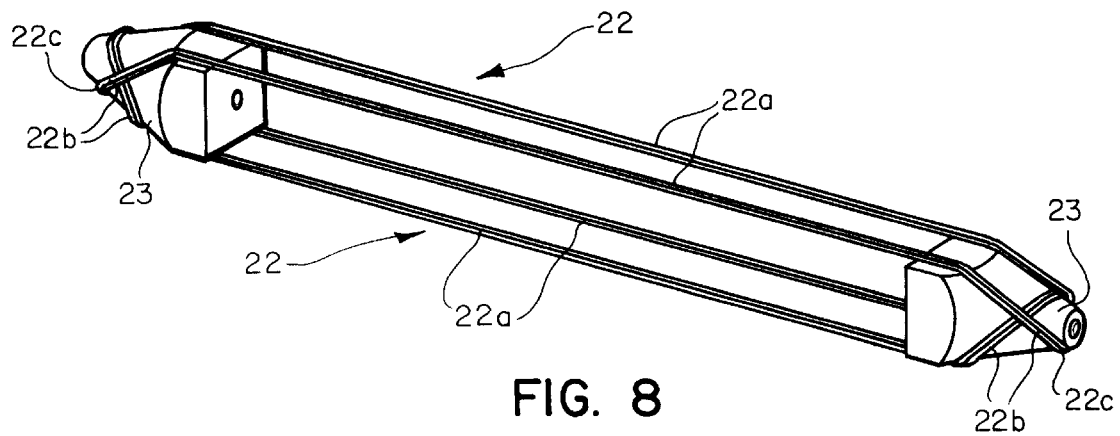

The three-dimensional, shell-shaped devices of FIG. 8 may be made with many different cross sections, such as rectangular, triangular, circular, elliptical, etc.

By way of comparing the strength and weight attributes of such a shell-shaped device with currently used standard steel reinforcing bars, an example is given for the deflected tendon bar device of FIG. 8 that is square in transverse cross section and composed of graphite fibers and epoxy resin, which are the preferred materials. For equal axial stiffness, where axial stiffness is the product of area and axial modulus, a circular steel bar ten millimeters in diameter will have an ultimate strength of three metric tons and a weight of sixty-five hundredths of a kilogram per meter. The equivalent composite bar of the invention of equal stiffness will be ten millimeters on a side, with an ultimate strength of twenty-two metric tons and a weight of sixteen hundredths of a kilogram per meter. The cross section of the composite bar of this construction will typically contain over one and one-half million filaments.

Figure 9:
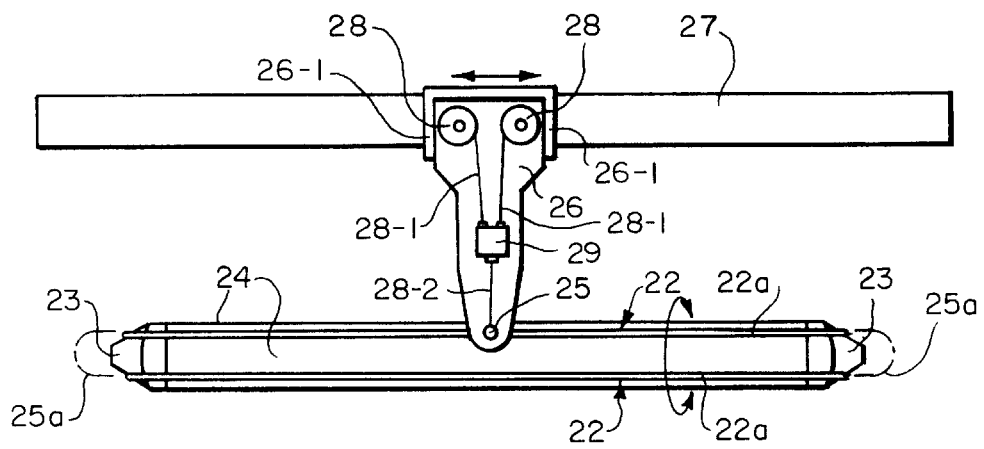
Figure 10:
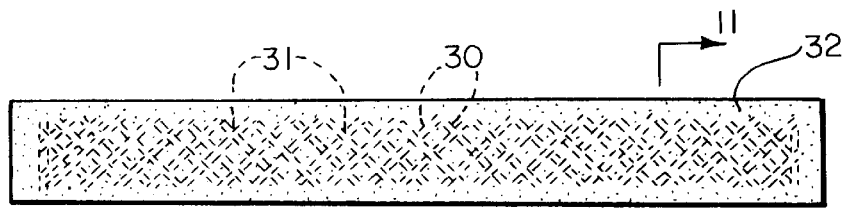
Figure 11:
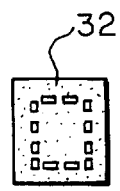
Figure 12:
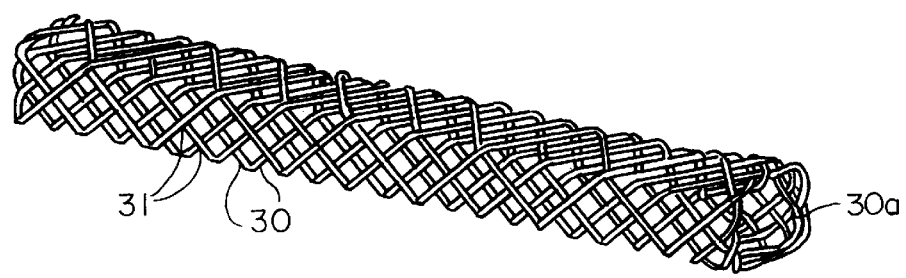
Figure 13:
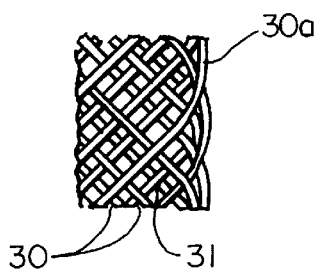

The method of making a deflected or angled tendon bar device, such as that of FIGS. 6 through 8, involves the use of the apparatus of FIG. 9, which is generally similar to the apparatus illustrated in FIG. 5, but has a preferably straight, elongate, and rotatably mounted center form piece 24, here shown as square in transverse cross section, with conical end form pieces, e.g. fid members 23, at opposite ends. The fiber band delivery eye 25 moves with a carrier 26 therefor, which, with its mounting 26-1, is reciprocated longitudinally on and along an elongate track 27 to lay down longitudinal tendon portions 22a of the band 22 of the bar reinforcing device 10 as form piece 24 of the apparatus remains stationary between partial rotations in opposite directions at opposite ends, respectively, of the reciprocative strokes of delivery eye 25, see the schematic showings at 25a, by known reciprocating means. Fiber tows, yarns, or strands 28-1 are fed from fiber bundles thereof on reels 28 through an applicator 29 holding a settable bonding liquid to form a continuous band 28-2, which is fed into delivery eye 25.

By this method and apparatus, a very large number of continuous filaments are brought together rapidly and adhered together to form the continuous band 28-2 the pair of belt-like band members 22, FIG. 8, that are deflected or angled at their ends so as to provide the mutually spaced, longitudinal tendons 22a and canted ends 22b extending along and deflected transversely of the conical end portions of fid members 23. The pair of band members 22, as shown, constitute a three-dimensional shell about the perimeter of the concrete reinforcing bar device. The liquid bonding agent is subsequently hardened to bond and maintain the filaments in the desired configuration. Following hardening of the bonding agent, at least the longitudinal center form piece 24 is removed.

Another embodiment of the invention is illustrated in FIGS. 10–14 as an interwoven, concrete reinforcing bar, formed in itself as a three-dimensional, open mesh shell. A preferably continuous band 30 of high strength, high modulus, advanced fibrous composite is interwoven and interlocked longitudinally and at opposite end portions to form tendon lengths of a mesh shell, which is of endless belt formation and encloses an elongate, three-dimensional space in unbroken continuity. The mesh shell, constituting a band member 30-1, FIG. 12, has a continuous perimeter of selectively directed and overlapped portions of the continuous, interlaced band 30.

Overlapped portions of band 30 form nodes 31, which provide anchorages for the concrete 32 in a beam or other shape. At the ends, diagonal portions 30a of band 30 are curved substantially tangent to the perimeter of the shell and provide additional anchorage as well as tensile continuity at the ends of the shell, which are open as shown.

Angulation of the band 30 at and adjacent to the overlaps or nodes 31 can be selected to best suit principal tensile and compression stress directions contemplated as arising in the concrete structure when exposed to anticipate external loads, for example, an angle set of +/−45° for shear stresses common to beams; an angle set of +/−85° for circumferential stresses in columns; an angle set of +/−10° for tensile and compression stresses in most all types of beams and slabs; and combinations of more than one band angle for combined shear, tension, and compression in concrete structure having complex loads. The multiple surfaces formed at each node provide high strength connections which can resist high interaction loads between the reinforcement and the concrete.

Comparing the strength attributes of such a shell mesh bar, that is interwoven and interlocked around its perimeter to form an advanced composite reinforcing device rectangular in right cross section as made up of graphite fibers and epoxy resin, with those of currently used steel reinforcing bars for equal stiffness, where stiffness is the product of area and modulus, a cylindrical steel bar of five millimeters diameter will have an ultimate strength of seven-tenths of a metric ton and a weight of sixteen-hundredths of a kilogram per meter, while the equivalent advanced composite mesh shell bar device of the invention will be, for example, three millimeters by nine millimeters in right cross section with an ultimate strength of five and one-half metric tons and a weight of four-hundredths of a kilogram per meter. The cross section of the composite bar will typically contain over three hundred eighty thousand filaments.

Figure 14:
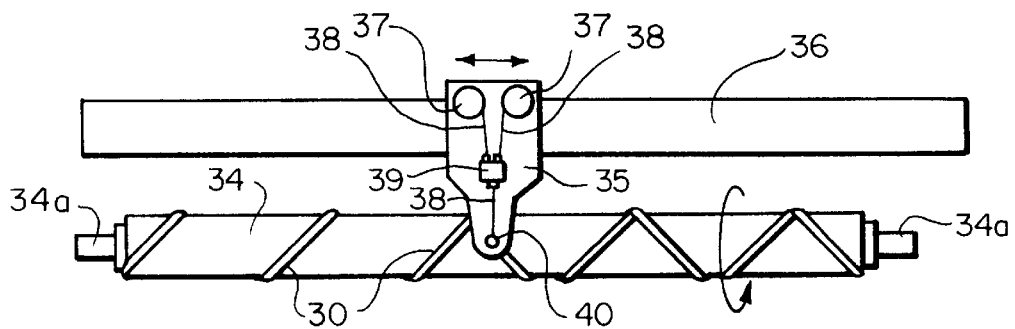

In producing the device of FIGS. 10–13, the method and apparatus shown in general and schematically by FIG. 14 utilizes an elongate mandrel 34, rotatably mounted by short shaft ends 34a, and a carriage 35 mounted for reciprocation on and along an elongate track 36. Carriage 35 carries reels 37 for feeding filament tows, yarns, or strands 38 of the advanced fibrous composite material in fiber bundles wound on such reels 37 through bonding resin applicator 39, from where the resulting continuous band 30 passes through fiber delivery eye 40 onto the surface of rotating mandrel 34 as shown.

Winding devices working with continuous band lengths are old in the art, but not with respect to indexing of band laydown such that there are spacings between laiddown band length portions so as to yield an open meshwork with anchoring nodes as required by this third embodiment of concrete reinforcing device. Thus, indexing is such that the initially laiddown band length portions are several times as widely spaced as will make the required meshwork openings, with repeated runs and return runs of the traveling-band-delivering eye back and forth along the rotating mandrel building up desired thickness of the band, and with intervening runs and return runs within the initial spacings overlapping the previously laid band lengths to provide the desired mesh openings with required anchoring modes.

Following the laying down of endless band 30 along the length of rotating mandrel 34 as a continuous bar or band member, which is here square or otherwise rectangular in transverse cross section, such mandrel 34 is removed from the resulting elongate, open-ended, continuous bar or band member by pushing it toward or pulling it from one of the open ends of the meshwork. The resulting three-dimensional bar or band member meshwork 30-1 is of endless belt formation defining an empty three-dimensional, internal space for receiving concrete should this device be embedded in concrete, or for converting into more or less flat sheet that may be used flatwise for reinforcing a concrete structure.

By this version of the method and apparatus of the invention, many different shell shapes can be made, for example, shells having cross sections that are triangular, rectangular, or otherwise polygonal, or circular, or elliptical, and longitudinally cylindrical, pyramidal, conical, or oblate, and combinations of these. It is best, however, that the cross section of the bar mesh shell shall be substantially rectangular to provide for the most effective overlapping at the nodes 31.

A large range of sizes is practical for devices of the invention. Cross sections may be a few square centimeters to as large as ten square meters and with lengths up to in excess of eighty meters. Many types of fibers can be used, including carbon, glass, and aramid, and many types of liquid bonding materials can be used, including thermoset and thermoplastic resins.

Although the foregoing description of various embodiments of apparatus and methods of using them for the purpose of producing concrete reinforcing devices of advanced composite material deal with what are presently contemplated as the best way of carrying out the invention in actual practice, it should be realized that the continuous band of advanced composite material could be one or more prebonded fiber bundles of tow, yarn, or strand as fed into the travelling eye of the band-laying apparatus in any suitable manner. Thus, it is the provision and operation of such apparatus, having a travelling, band-laying eye arranged to reciprocate along form means constituting at least one elongate, removable form piece, whose construction and operation constitute the apparatus and method of the present invention.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. An advanced fibrous composite, concrete reinforcing bar device of high strength, high modulus, fibrous laminate material having a multitude of very fine structural filament bonded together as laminae, comprising fid members spaced apart longitudinally at opposite ends of an elongate, three-dimensional space; said fid members being of longitudinal, outwardly extending, substantially conical formation; and a pair of endless belt band members, each having elongate, substantially entirely mutually spaced tendons extending longitudinally at opposite sides, respectively, of said three-dimensional space, with canted ends interconnected with said tendons and extending along and transversely around said fid members, respectively, forming a three-dimensional, shell shape as a concrete reinforcing bar device.

2. A concrete structure reinforced by the combination therewith in a strengthening manner of at least one reinforcing bar device having at least one elongate band of endless loop formation with opposite loop end portions and providing, between said loop end portions, a pair of substantially entirely mutually spaced, elongate, longitudinal members as load-bearing tendons with which said end portions are connected, said band being made of fibrous material having a multitude of structural filaments bound together by a set bonding material.

3. A method of producing an advanced fibrous composite, concrete reinforcing bar device of high strength, high modulus, fibrous laminate material having a multitude of very fine structural filaments bonded together as laminae by feeding a continuous length of said fibrous material, including a settable, liquid, bonding material, into and through delivery means having a delivery eye mounted for traveling along an elongates removable form piece disposed between fid members of substantially conical formation at opposite ends, respectively, of said form piece; reciprocating said delivery eye longitudinally along opposite sides of said form piece and transversely along and canting around said fid pieces, from one side to the opposite side of said form pieces, to lay down substantially entirely mutually spaced, elongate tendons and canted end portions of endless belt band members, respectively, that are interconnected with said tendons, to form a three-dimensional, shell shape as a concrete reinforcing bar device; and removing said form piece to provide elongate, three-dimensional space between said tendons and said end portions of the respective band members.

4. A method of producing a reinforced concrete structure, comprising making an advanced fibrous composite, concrete reinforcing bar device of high strength, high modulus, fibrous laminate material having a multitude of very fine structural filaments as laminae by feeding a continuous length of said fibrous material, including a settable liquid bonding material, into and through reciprocating delivery means having a delivery eye traveling along form means, that has at least a removable, elongate, center form piece, to lay down an elongate band member with substantially entirely mutually spaced, longitudinal, load-bearing tendons and continuous loop end portions interconnected with said tendons; removing said center form piece after the bonding material has set to leave an empty space between said tendons; and incorporating the resulting concrete reinforcing bar device in a concrete structure as a concrete reinforcing member.

5. A method in accordance with claim 4, wherein the resulting concrete reinforcing device is incorporated in a concrete structure by embedding said reinforcing device in a concrete as a concrete reinforcing memeber.

6. A method in accordance with claim 4, wherein the form means also comprises opposite end pieces, which, when the center form piece is removed, are left in place as fid members of the concrete reinforcing device useful in pretensioning or post-tensioning a reinforced concrete structure with which said device becomes associated.

7. A method in accordance with claim 4, wherein the resulting concrete reinforcing device is incorporated in a concrete structure by attaching it to such concrete structure as a concrete reinforcing member.

8. A method in accordance with claim 4, wherein the delivery eye is reciprocated about the center form piece along the longitudinal axis thereof and transversely of and about the opposite ends thereof.

9. A method in accordance with claim 8, wherein the delivery eye is reciprocated transversely of the center form piece at the ends thereof as it is being reciprocated longitudinally to form a bar or bars as a three-dimensional shell.

10. A method in accordance with claim 4, wherein the center form piece is a rotatable mandrel and is rotated as the delivery eye is reciprocated, so the continuous band is laid down as an elongate, open mesh shell interwoven longitudinally and at opposite ends in unbroken continuity of elongate belt-like formation as a three-dimensional bar.

11. A method in accordance with claim 4, wherein the band is laid down on the form piece on an indexed basis to provide a three-dimensional, open meshwork, starting with a run with spacings between band length portions wider than desired for the meshwork openings and continuing with intervening runs that will provide the desired mesh openings with overlapping providing anchoring nodes.

* * * * *